Sept. 19, 1961

A. P. JACKEL ET AL

COORDINATION CIRCUITS FOR REMOTE CONTROL AND INDICATION SYSTEMS 3,001,182

Filed Oct. 1, 1957

2 Sheets-Sheet 1

Sept. 19, 1961 A. P. JACKEL ET AL 3,001,182

COORDINATION CIRCUITS FOR REMOTE CONTROL AND INDICATION SYSTEMS

Filed Oct. 1, 1957 2 Sheets-Sheet 2

United States Patent Office 3,001,182
Patented Sept. 19, 1961

3,001,182

COORDINATION CIRCUITS FOR REMOTE CONTROL AND INDICATION SYSTEMS

Arthur P. Jackel and Donald E. Stark, Penn Township, Allegheny County, Pa., assignors to Westinghouse Air Brake Company, Wilmerding, Pa., a corporation of Pennsylvania Filed Oct. 1, 1957, Ser. No. 687,478
14 Claims. (Cl. 340—180)

Figure 1:
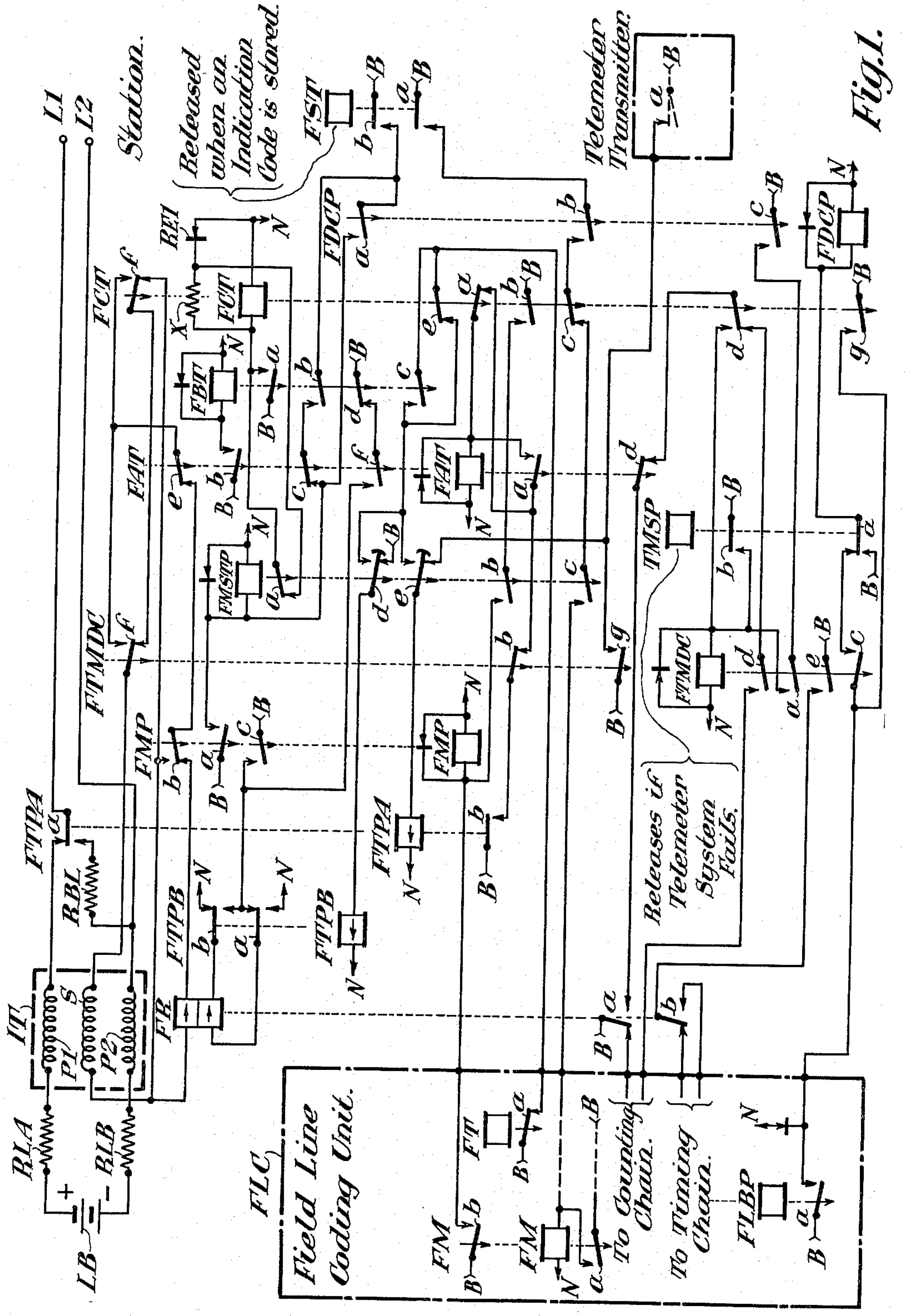

Our invention relates to coordination circuits for remote control and indication systems. More particularly, our invention relates to coordination circuits to permit a coded centralized control system and a coded telemetering system to share a common communication channel.

The use of common communication channels by various communication systems and/or control systems is well known. It is the usual practice for the well-known time-code control system and other centralized control systems to normally share the communication channel with carrier or voice telephone circuits, with telegraph and Teletype channels, and with other forms of communication equipment. Several remote control systems may even be superimposed upon carrier circuits in order to increase the number of such systems which may be transmitted over the common channel. In the past, it has likewise been common for railroad centralized traffic control systems, particularly of the coded remote control type, and the usual dispatchers telephone selector systems to use a single communication channel. Such common use is shown in the prior art in this field. If each of these control systems is of the code type, coordination is required in order to avoid conflict. This is particularly true when the telephone selector system is of the polar code type which is particularly well known. In such joint use, the telephone selectors are normally off the line since their use is relatively infrequent when compared with the operation of the centralized control system. Coordination circuits are then provided to remove the centralized traffic control system from the communication channel and to connect the telephone selector system for code transmission only for the period required to send such selector codes. The centralized traffic control system, frequently of the time-code type, is then returned to the line circuit or other communication channel and allowed to reset in its normal fashion. These coordination circuits thus prevent the recording of false control and/or indication functions at the office and various remote stations.

However, different problems are encountered when codes of a remote control system, particularly of the time-code type, and a telemetering system are transmitted over a common channel. Most of the problems arise because the lengths of the pulses employed in the telemetering systems are of the same relative time length as the reset periods of the centralized control system. This creates a particular problem since, with the telemeter codes normally transmitted over the channel, insufficient time is available during these codes to assure the reset of the time-code apparatus before the telemetering cycle reoccurs. Thus, the time-code or remote control apparatus, which is normally in the locked-out condition and therefore must reset to synchronize before codes can be transmitted, cannot by itself seize the channel and lock out the telemeter code. In other words, the principal problem is to provide sufficient time to allow the time-code system to take control of the channel and then transmit such control or indication codes as may be stored.

The problem resolves itself into providing means whereby the control system may be activated from its normally locked-out or at-rest condition so as to seize control of the channel. The telemetering indication system must be removed from the channel and held static until the control system resets and begins its code transmission. Once the control system is active in transmitting a code, it is capable of retaining control of the line circuit and holding the telemetering system locked-out. A solution to this problem is the provision of a coordinating gate arrangement which is periodically opened to allow the remote control code system to indicate its requirements for use of the line circuit to transmit codes. If no such requirement exists, the telemetering system may be allowed to continue its operation. However, if the centralized control system indicates the necessity for use of the line circuit, coordination may be effected to allow this operation.

It is accordingly an object of our invention to provide an improved coordination circuit arrangement whereby two coded control and/or indication systems may share the use of a common communication channel.

It is also an object of our invention to provide coordination circuits for a telemetering system and a coded centralized control system so that these two systems may use the same communication channel.

A still further object of our invention is to provide coordination circuits for a normally operating coded telemetering system and a time-code remote control system to permit the two systems to share the same communication channel on a time-required basis.

Another object of our invention is to provide coordination circuit arrangements which include a gating means to allow a remote control system sufficient time to indicate its requirement for transmitting a code and thus initiate the conversion from a telemeter code to the control system code.

It is also an object of our invention to provide an improved coordination system between two code transmission systems using a common communication channel, a first one of these systems being normally active and periodically actuating a gating means which provides a period of time for the second system to indicate its requirement for use of the channel and to initiate a transfer operation which establishes the second system in sole control of the communication channel for the required time period.

Other objects and features of our invention will become apparent from the following specification when taken in connection with the accompanying drawings and appended claims.

In practicing our invention, we provide a single communication channel, such as a two-wire line circuit, over which both the telemetering system codes and the centralized system control and indication codes are transmitted in turn. Normally, telemeter codes are transmitted over the channel in continuously recurring cycles. This coding is interrupted only for the duration of such control or indication codes as are required. At the conclusion of the centralized system codes, the telemeter codes are reapplied to the channel. The telemeter codes consist of recurring cycles, each of which includes an energized period during which current is supplied to the channel and a period during which the channel or circuit is deenergized. Each of these periods is of a relatively long time interval when compared with the steps of the other codes. The telemeter code cycle is of constant length, but the "on" and "off" periods in each cycle vary in accordance with the intelligence to be transmitted. Coordination between the two systems takes place during the telemeter code "on" time.

To accomplish this coordination, a gating circuit means at each end of the communication line is provided. This gating circuit means comprises a chain of three timing relays which are energized simultaneously at the beginning of the telemeter code off-time, that is, when the channel is open. When the channel is closed, the gating relays release in a timed sequence, that is, in cascade. This release sequence at the two locations occurs very nearly simultaneously. During the time period provided by this cascaded release, which is completed during the telemeter code on-time, a gate is opened to allow the insertion of a coordination pulse. In one telemetering system where the code on-time is a minimum of one second, the gate is open approximately 150 milliseconds after the line is closed and remains open for approximately 400 milliseconds. If a centralized system control or indication code is stored, a coordinating pulse is inserted and placed on the line during this gate-opened period. In the system shown, this pulse may consist of either a line-open period or a line-shunted period. Insertion of the pulse is controlled by a starting repeater relay and by the release cycle of the gating relays, transmission of the pulse occurring approximately midway in the open gate period. Reception of the pulse at each location initiates the conversion to operation of the centralized control system. A telemetering disconnect relay at each location is energized and picks up, and is repeated by a disconnect repeater relay. These two relays, together with the start repeater relay, transfer control of the coding action to the centralized control system, that is, to the time-code system which transmits the control and indication codes. In other words, at each location, the control of the transmitter repeater relays is transferred to the centralized control system.

The telemetering disconnect relay and its repeater and the start repeater relay are held energized until all of the required centralized control or indication codes have been transmitted. The holding energy for these relays is provided by a bridging relay within the centralized control system apparatus. These relays are also provided with slow-release characteristics in order to bridge the time interval between such codes which occur successively. During this period of transmission of control or indication codes, the telemetering readings at the office are held intact in the final position occupied immediately prior to the transfer operation. When all of the required control or indication codes have been transmitted at any one period, the disconnect and transfer relays are deenergized and release to return the control of the transmitting repeater relays to the telemeter transmitter at the station and, at the office, to reconnect the telemeter receiver to the control system.

Referring now to the drawings, FIG. 1 thereof shows diagrammatically one form of circuit arrangement embodying our invention located at a remote or field station. In the system illustrated, the telemeter codes originate at this location while the centralized control system initiates indication codes and receives control codes at the same location.

Figure 2:
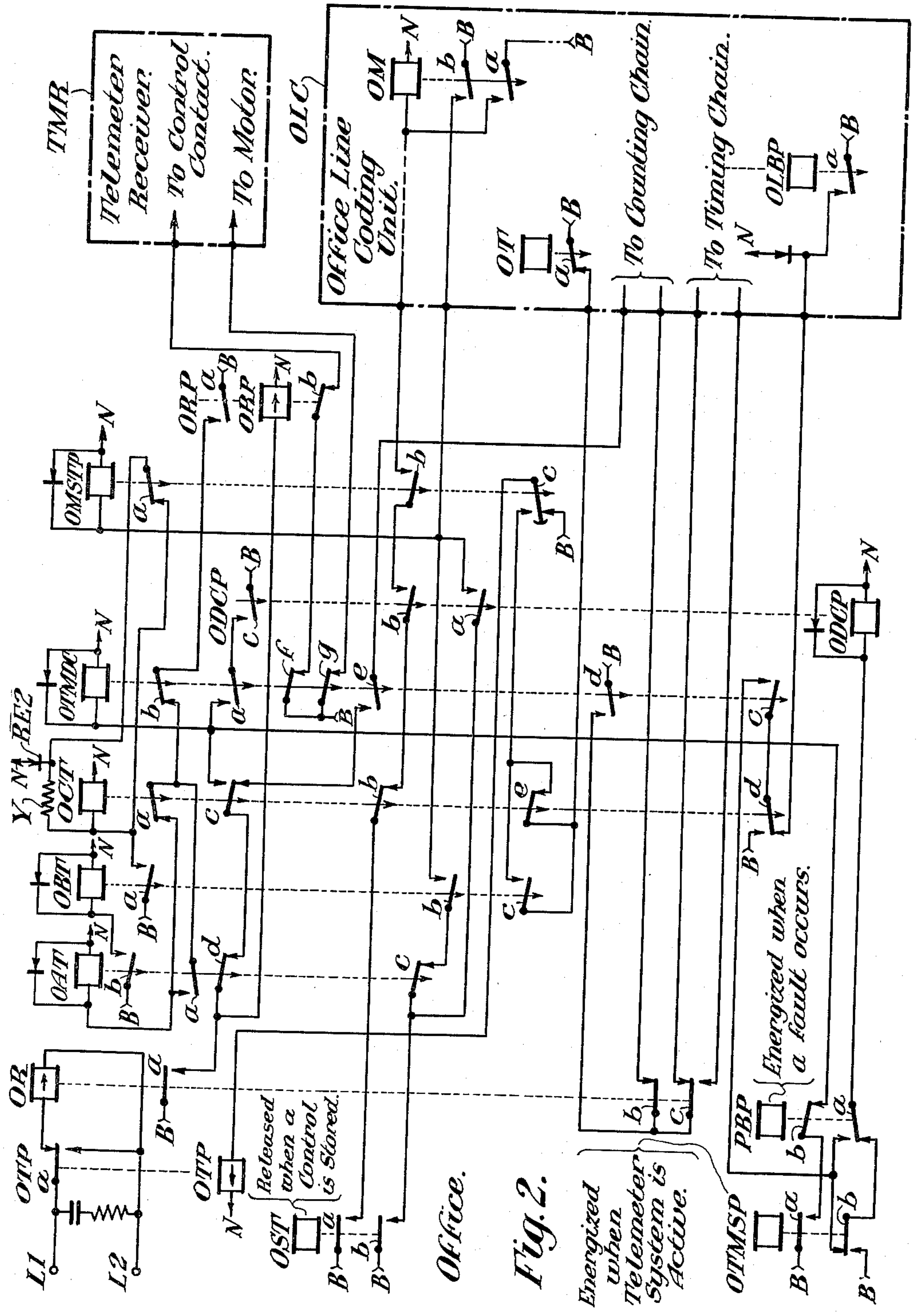

FIG. 2 shows diagrammatically the form of circuit arrangement embodying our invention which cooperates with the circuits at the field station and which is located at the control or central office of the illustrated system. The telemeter codes are received at this location while centralized control codes are originated here and indication codes received and recorded.

In each of the drawings, similar reference characters refer to similar parts of the apparatus shown.

In the diagrammatic showing in the drawings of the circuit arrangements embodying our invention, conventional symbols have been used to simplify the illustration. Certain of the relays such as the office line relay OR in FIG. 2, are of the biased relay type and are so designated by an arrow shown within the relay winding symbol. Contacts of these relays, however, are shown in the usual horizontal position. Operation of these relays is characterized by response to current flowing through the relay winding only in the direction of the arrow shown. That is, the relay is actuated to close its front contacts only when the energizing current flows through the relay winding in the direction of the arrow. When the relay is deenergized, or if the current flow through the winding is in the direction opposite to the arrow, the relay remains or operates to its released position, closing back contacts. The line relay FR in FIG. 1 is of the magnetic stick type and is likewise shown with an arrow inside the symbol for each of its two windings. However, this relay is distinguished from the biased type by showing its contacts in the vertical position. It is a characteristic of magnetic stick relays that, when either or both of the windings is energized by current flowing in the direction of the arrow, the relay contacts are operated to the normal or left-hand positions. If the current flow through either winding is in the direction opposite to the arrow, the contacts are operated to close in the right-hand or reverse position. When the relay windings are deenergized, the contacts remain in the position to which they were last operated by energy flowing through either winding.

The majority of the other relays shown, which are of the neutral type, are provided with slow release characteristics. In addition, the slow release period of many of the relays is further increased by the use of a half-wave rectifier snub in multiple with the relay winding. The contacts of all slow release relays are designated by a vertical arrow, pointing downward, drawn through the movable portion of each contact to indicate that they are slow acting in this direction. Where a transfer type contact of any of these relays is of the continuity transfer type, that is, front contacts are closed before the corresponding back contacts are open and vice versa, a short arc is appended to the free end of the movable portion of such transfer contacts. Each of the two locations shown is provided with a local source of direct current energy which may be a battery of proper size and capacity. However, for simplicity, these local batteries are not shown and only the positive and negative terminals thereof are designated by the conventional reference characters B and N, respectively.

As shown in the drawings, the remote or centralized control system is of the single station type. In other words, this system consists only of the central office of FIG. 2 and the single station of FIG. 1. These two locations are connected by a communication channel. For convenience and simplicity, this channel is illustrated as a two-wire line circuit designated in each of the figures by the terminals L1 and L2. It is to be understood, and will become obvious as the specification progresses, that other forms of communication channels may be used, such as simplex circuits superimposed upon voice-frequency telephone systems or any one of the many forms of carrier channels presently available in the art. As shown, the line battery LB in FIG. 1, which supplies the line circuit energy both for the telemetering system and the centralized control system, is located at the station which is opposite to that considered normal for most centralized control systems. However, as the description continues, it will become obvious, and it is to be understood, that our invention includes arrangement of the various functions of the coordination system that will permit the line battery to be located at the central office location. It is also to be understood that the system may be so modified as to permit the use of more than one field station.

Referring now to FIG. 1, as indicated previously, the one form of apparatus embodying our invention which is shown thereon is located at the field or remote station of the system. The line circuit apparatus at this location is shown across the top of the drawing, with the terminals L1 and L2 at the upper right. The line circuit elements comprise a line battery LB, the current limiting resistors RLA and RLB, primary windings P1 and P2 of an impulse transformer IT outlined in the dotted square, a bleeder resistor RBL, and front and back contacts *a* of a transmitter repeater relay FTPA. It is obvious that, as shown in the drawing, energy is supplied from the positive terminal of battery LB through resistor RLA, primary winding P1 of transformer IT, and front contact *a* of relay FTPA to terminal L1, returning from terminal L2 through primary winding P2 of the impulse transformer and resistor RLB to the negative terminal of battery LB. When back contact *a* of relay FTPA is closed, the line circuit represented by terminals L1 and L2 is shunted and any charge stored therein is bled off by resistor RBL. Under these conditions, the line circuit is deenergized, the supply of energy from battery LB being interrupted at front contact *a* of relay FTPA. Terminals L1 and L2, as shown in FIG. 1, are the same as the similarly designated terminals shown in FIG. 2 as will be described hereinafter.

The station is provided with a line relay FR, which was previously defined as being of the magnetic stick type. This relay receives control codes from the central office through the medium of secondary winding S of impulse transformer IT, as will be described in more detail hereinafter. Relay FR, through its normal and reverse contacts *a* and *b* drives the field line coding unit FLC, the connections being direct to the unit except from reverse contact *a* which will be described shortly. The unit FLC is part of the basic centralized control system. Since such systems are well known in the art, unit FLC is shown conventionally by a dot-dash rectangle, only such details being included therein as are necessary for an understanding and description of our present invention. For a complete understanding of the apparatus and circuits included in such a coding unit, reference is made to Instruction Manual 510, entitled Time Code Control System, published by the Union Switch and Signal Division of Westinghouse Air Brake Company in June 1955, or to Letters Patent of the United States No. 2,442,603, granted June 1, 1948, to A. P. Jackel for a Remote Control System. The system shown in either of these references may be used as the centralized control system in conjunction with the coordination circuits of our present invention and for a complete understanding of such systems reference is made to this instruction manual or prior patent.

Shown conventionally within the dot-dash rectangle representing the coding unit are the field master relay FM, the field transmitter relay FT, and the field code pulse bridging repeater relay FLBP, which is part of the timing chain also referred to within the unit. As will be indicated shortly, relay FM is energized at the beginning of an indication code and thereafter remains energized, over a stick circuit including its own front contact *a*, until the indication code is completed. Transmitter relay FT is driven by circuits within the unit to periodically open and close its contact *a* in a pattern which is representative of the indication code to be transmitted. The bridging repeater relay FLBP is energized during the initial step of each indication code or received control code during the initial operation of the timing chain as controlled by line relay FR. Once energized, relay FLBP remains energized until the code is completed being among the last of the coding unit relays to release upon the completion of any coding action. For further details concerning the specific operation of the counting chain and the timing chain and other relays within the coding unit, reference is again made to the previously listed instruction manual or prior patent.

The station is also provided with a chain of timing or gating relays FAT, FBT, and FCT. Relay FAT is energized by a circuit traced from terminal B over back contact *b* of relay FTPA, back contact *b* of telemetering disconnect relay FTMDC, back contact *a* of relay FCT, and the winding of relay FAT to terminal N. The closing of front contact *a* of relay FAT bypasses back contact *a* of relay FCT in the original energizing circuit and completes a stick circuit for relay FAT effective when back contact *a* of relay FCT opens. The closing of front contact *b* of relay FAT completes an obvious circuit for energizing relay FBT which then picks up. The closing of front contact *a* of relay FBT completes the energizing circuit for relay FCT and this latter relay also picks up. It is obvious that the three gating relays pick up at approximately the same instant upon the closing of back contact *b* of relay FTPA.

Each of these gating relays is of the slow release type and each winding is snubbed by a half-wave rectifier to provide additional timing upon relay deenergization. Relay FCT is provided with a short and a long release time through the means of a resistor which at times is connected in series with the half-wave rectifier shunt. Under normal conditions, the rectifier shunt is traced from the left terminal of the winding of relay FCT over back contact *a* of master and/or start repeater relay FMSTP and the half-wave rectifier RE1 in its reverse direction to the right-hand terminal of the relay winding. When back contact *a* of relay FMSTP is open, the snub is traced from the left-hand terminal of the winding through resistor X and rectifier RE1 in its reverse direction to the right-hand terminal of the relay winding. It is well known that the insertion of a resistance in series with a snubbing rectifier across a relay winding reduces the release time of the relay. Thus, with resistor X shunted out by back contact *a* of relay FMSTP, relay FCT has a longer release time than when the resistor is included in series with half-wave rectifier RE1. The function of this snubbing circuit arrangement will be more fully described during the operational description of the system of our invention.

As already indicated, the station apparatus is provided with a master and/or start repeater relay FMSTP which repeats both start relay FST and master relay FM within unit FLC. As will appear hereinafter, one function of this relay is to transfer the circuits controlling code transmission between the telemetering system and the centralized control system. Relay FMSTP is initially energized during the release cycle of the gating chain, i.e., gate open, if the start relay is released, relay FST being released only when an indication code is stored for transmission at this station location. This circuit for relay FMSTP includes back contact *b* of relay FST, front contact *b* of relay FBT, back contact *c* of relay FAT, and and the winding of relay FMSTP. The contacts of the gating relays are subsequently bypassed by the closing of front contact *a* of a disconnect repeater relay FDCP which will be more fully described shortly. Relay FMSTP is held energized for the duration of an indication code by a simple circuit completed at front contact *a* of the master repeater relay FMP. During indication codes, relay FMP directly repeats master relay FM, being held energized over front contact *b* of relay FM. Initially, relay FMP is energized by a circuit traced from terminal B over front contact *b* of relay FCT, front contact *b* of relay FMSTP, and the winding of relay FMP to terminal N. The energizing circuit for master relay FM extends from terminal B over back contact *a* of relay FST, front contact *b* of relay FDCP, back contact *c* of relay FCT, front contact *c* of relay FMSTP, various circuits within the unit FLC indicated here by a conventional dotted line and shown in detail in the previously listed references, and the winding of relay FM to terminal N. Relay FM is retained energized by a stick circuit completed over various relay contacts within the coding unit and its own front contact *a*. It thus becomes obvious that, unless the storage of an indication code is indicated by the closing of back contacts of relay FST, relays FMSTP, FMP, and FM cannot be energized during the gating action.

The gating relay chain in conjunction with line relay FR controls the field telemetering disconnect relay FTMDC. If relay FR occupies its reverse position during the release cycle of the gating chain operation, that is, during the gate-open period, a circuit is completed from terminal B over reverse contact *a* of relay FR, back contact *d* of relay FAT, front contact *d* of relay FCT, and the winding of relay FTMDC to terminal N. This latter relay, thus energized, picks up at this time. This relay winding is also shunted by a half-wave rectifier to extend the release time of the relay. The closing of front contact *c* of relay FTMDC completes an energizing circuit for its repeater relay FDCP, the circuit further including front contact *g* of relay FCT, front contact *a* of a telemetering stick repeater relay TMSP, and the winding of relay FDCP. Relay FDCP, thus energized, picks up and closes its front contact *c* to complete a stick circuit for relay FTMDC which includes also front contact *a* and the winding of this latter relay. A holding circuit for relay FDCP, completed during coding or reset action of unit FLC, includes front contact *a* of relay FLBP, this contact replacing front contact *g* of relay FCT in the initial circuit. Relay FDCP also is provided with slow release characteristics which are extended by the half-wave rectifier snub.

When relay FTMDC picks up, it completes, or prepares for completion, circuits by which relay FR controls the counting and timing chains of coding unit FLC. The closing of front contact *d* of relay FTMDC provides for the completion of a circuit from reverse contact *a* of relay FR over back contacts *d* of relays FAT and FCT which extends to one of the two connections to the counting chain relays, the other connection being directly from normal contact *a* of relay FR. The closing of front contact *e* of relay FTMDC completes a circuit from terminal B to contact *b* of relay FR which is then alternately completed over normal and reverse contacts to drive the timing chain relays. The opening of back contact *b* of relay FTMDC interrupts the circuit which initiates the energization of the gating relay chain so that the gating relays do not operate during the period that the centralized control system is transmitting its codes. The closing of front contact *f* of relay FTMDC completes a circuit to make relay FR, through its upper winding, responsive to secondary winding S of impulse transformer IT, which operation will be described in more detail hereinafter.

The station location is further provided with two transmitter repeater relays FTPA and FTPB. During normal conditions, that is, when telemeter codes are being transmitted, relay FTPB is held energized by a simple circuit completed at back contact *d* of relay FMSTP. Under these conditions, relay FTPA is responsive to the operation of the telemeter transmitter contact *a* which periodically closes its front contact in accordance with the telemeter code being transmitted. The circuit for relay FTPA at this time also includes back contact *e* of relay FMSTP. Contact *a* of telemeter transmitter is shown dotted in both positions to indicate conventionally that this contact is periodically operating in a continuous cycle between its upper and lower positions. In one particular telemetering system which may be used for transmitting the telemeter codes in the system of our invention, the telemeter code cycle is of five seconds' duration. Of this time interval, front contact *a* of the transmitter may be closed from a minimum of one second to a maximum of four seconds. Thus the on-time of the telemeter code varies from a minimum of one second to a maximum of four seconds, with the off-time varying in the opposite direction from a maximum of four seconds to a minimum of one second. Relay FTPA transmits this telemeter code over the line circuit by periodically opening its front contact *a* to interrupt the supply from line battery LB to terminal L1 of the line circuit. The pattern of operation of front contact *a* of relay FTPA obviously repeats exactly the pattern of contact *a* of the telemeter transmitter as long as back contact *e* of relay FMSTP remains closed.

When the apparatus has transferred to centralized control operation and an indication code is to be transmitted from the station, relays FTPA and FTPB are operated in multiple. The circuit extends from terminal B at back contact *a* of relay FT in unit FLC, over back contact *e* of relay FCT, and front contact *d* of relay FMSTP and the winding of relay FTPB in multiple with front contact *e* of relay FMSTP and the winding of relay FTPA, to terminal N. The two transmitter repeater relays thus repeat the code pattern of back contact *a* of relay FT under these conditions. Front contact *a* of relay FTPA interrupts the supply from line battery LB in a similar pattern to transmit the indication code over the line circuit to the central office. If the system has transferred to centralized control but no indication code is stored for transmission so that relay FMSTP is released, relay FTPB remains steadily energized over the previously traced circuit normally in effect. Relay FTPA is also retained energized under these conditions by the circuit from terminal B over front contact *g* of relay FTMDC, back contact *e* of relay FMSTP, and the winding of relay FTPA to terminal N. Front contact *a* of relay FTPA thus remains continuously closed to permit control codes to be received from the office location in a manner which will be more fully described hereinafter.

During the gating period, if an indication code is stored for transmission, relays FTPA and FTPB operate to transmit the coordinating pulse which actuates the transfer operation. During the release cycle of the gating chain, when relay FMSTP is energized as a result of the release of relay FST, relays FTPA and FTPB are initially retained energized over front contact *c* of relay FBT, which is in multiple with then open back contact *e* of relay FCT. During the transfer of contacts *d* and *e* of relay FMSTP from their back to their front positions, there is no interruption in the energization of the transmitter repeater relays since these two transfer contacts are of the continuity type previously described. When relay FBT releases in the gating chain cycle, the circuit for relays FTPA and FTPB is interrupted, since back contact *e* of relay FCT is not yet closed, and the two transmitter repeater relays release. They are again energized upon the release of relay FCT to close its back contact *e*, the circuit being as previously traced, originating at back contact *a* of relay FT which is steadily closed at this time. It will be remembered that, under these conditions, with back contact *a* of relay FMSTP open, the release time of relay FCT is of a shorter length than under normal conditions due to resistor X being in series with rectifier RE1. The release of relay FTPA to open its front contact *a* causes the transmission of a line-open coordinating pulse over the line circuit to initiate the transfer action at the office. As will appear shortly, the release of relay FTPB under these conditions causes relay FR to operate its contacts to their reverse position for the duration of the coordinating pulse. This action holds unit FLC locked out until the relay contacts return to their normal positions to initiate the normal reset action prior to the transmission of the indication code.

As has been previously indicated, relay FR is at times responsive to pulses of current induced in secondary winding S of impulse transformer IT. These pulses of current are induced as a result of changes in the current flowing in primary windings P1 and P2 of the transformer. The change of current may result from the interruption of the line circuit at front contact *a* of relay FTPA or may result from a shunt placed across the line circuit at some remote location such as the office, as will be hereinafter described. It is obvious, since the three windings of transformer IT are inductively connected, that the increase and decrease of the primary current will cause current to flow in opposite directions in the secondary winding in the form of pulses.

However, during the operation of front contact *a* of relay FTPA to follow the pattern of the telemeter code being transmitted, it is desirable to retain relay FR in its normal position in order to retain field line coding unit FLC at rest, that is, non-operative. For this reason, during transmission of telemeter codes, a shunt is placed on the secondary winding of the transformer which may be traced from the right-hand terminal of winding S over back contact *f* of relay FTMDC and back contact *f* of relay FCT to the left-hand terminal of the secondary winding. Under these conditions, the circuit extending from the right terminal of the upper winding of relay FR over back contact *b* of relay FMP and back contact *e* of relay FAT is open at front contacts *f* of relays FTMDC and FCT. Since the circuits for the lower winding are likewise interrupted, relay FR, being of the magnetic stick type, retains its contacts in the position to which they were last operated which, in the central control system used herein, is the normal position.

During the off-time of the telemeter code when the gating relays all pick up, the shunt on the secondary winding is interrupted at back contact *f* of relay FCT. However, at the same time, the circuit for the upper winding of relay FR is interrupted at back contact *e* of relay FAT. During the release cycle of the gating chain, relay FR is connected to the secondary winding so that it may respond to a coordinating pulse transmitted from the office. This circuit may be traced from the right-hand terminal of winding S over back contact *f* of relay FTMDC, front contact *f* of relay FCT, back contact *e* of relay FAT, back contact *b* of relay FMP, and the upper winding of relay FR to the left terminal of winding S. Any coordinating pulse from the office will be such as to cause current to flow in this circuit in the direction opposite to the arrow in the upper winding so that relay FR operates initially to its reverse position. Termination of the coordinating pulse causes the relay to return to its normal position to initiate the normal reset action of the coding unit.

However, if an indication code is to be transmitted so that the coordinating pulse originates at the station, the opening of back contact *b* of relay FMP, which occurs shortly after the closing of back contact *e* of relay FAT and prior to the opening of front contact *a* of relay FTPA, reopens the circuit for the upper winding of relay FR. At the same time, the closing of front contact *b* of relay FMP renews the shunt on secondary winding S. The shunting circuit at this time includes front contact *b* of relay FMP, back contact *e* of relay FAT, front contact *f* of relay FCT, and back contact *f* of relay FTMDC. When relay FTMDC picks up, its front contact *f* bypasses contact *f* of relay FCT in the shunt circuit and the shunt is maintained on the secondary winding during the transmission of the indication code.

If an indication code is to be transmitted, relay FR is also initially held in its normal position by the circuit traced from terminal B over front contact *c* of relay FMP, front contact *a* of relay FTPB, the lower winding of relay FR, and front contact *b* of relay FTPB to terminal N, the flow of current being in the direction of the arrow in the lower winding. When relay FTPB releases during the transmission of a coordinating pulse, as was previously described, its contacts *a* and *b* pole change the circuit for the lower winding of relay FR so that current flows in the opposite direction in the lower winding and causes relay FR to operate to its reverse position. Relay FTPB, at the termination of the pulse, picks up, again pole changing the circuit to return to its original condition and relay FR operates to its normal position to initiate the normal reset action of coding unit FLC. During the transmission of an indication code, the operation of relay FTPB to repeat the operation of back contact *a* of relay FT drives relay FR alternately to its reverse and normal positions to follow the code pattern. Operation of contacts *a* and *b* of relay FR under these conditions drives the coding unit to advance the code in the usual manner, as is fully explained in Instruction Manual 510 or Patent 2,442,603, both previously mentioned. During the reception of a control code from the office, relay FR is controlled by pulses induced into winding S of the impulse transformer, the circuit including winding S, front contact *f* of relay FTMDC, back contacts *e* and *b* of relays FAT and FMP, respectively, and the upper winding of relay FR.

One other control circuit for relay FR extends from terminal B over back contact *d* of relay FBT, front contact *f* of relay FAT, front contact *a* of relay FTPB, the lower winding of relay FR, and front contact *b* of relay FTPB to terminal N. This circuit is briefly completed when the gating chain relays are energized and pick up in order. The circuit is useful to assure that relay FR is held in its normal position at the beginning of the open circuit time of the telemeter codes to counteract any momentary effect on the upper winding of relay FR by secondary winding S of the impulse transformer.

Referring now to FIG. 2, the apparatus shown therein, as previously mentioned, comprises the office location in the system embodying our invention which cooperates with the station apparatus of FIG. 1. In the upper left of FIG. 2, the line circuit connections at this location are illustrated. Terminals L1 and L2 are the equivalent of the similar terminals shown in FIG. 1 and represent the connections at the office to the communication channel being used, specifically in this application, a two-wire line circuit for simplicity. The line circuit connections may be traced from positive line L1 over front contact *a* of office transmitter repeater relay OTP through the winding of office line relay OR to line L2. Line relay OR, a biased type relay, follows both the telemeter codes and the centralized indication codes transmitted from the station location. Relay OR is repeated by the line relay repeater ORP which is a back contact repeater having a simple energizing circuit including back contact *a* of relay OR and the winding of relay ORP. This latter relay follows reversely the code pattern received by relay OR, picking up each time relay OR is released. The line circuit is shunted on occasions by release of relay OTP to close its back contact *a*. This shunt bypasses the winding of relay OR, which releases, and causes, by eliminating the resistance of the winding of relay OR, an increase in the line current. As will appear shortly, the operation of relay OTP repeats the pattern of the control code being transmitted which is then received at the station location. The system thus differs from those shown in the listed references, particularly that of the Patent 2,442,603, in which control codes are transmitted by opening the line circuit at the office and indication codes by shunting the line circuit at the field stations. However, in the present case, where the line battery is shown at the field location, this reversal of the usual method of operation is necessary. However, it is to be understood that this system of operation may be modified within the scope of the invention to utilize the method of operation shown in the listed references.

The office location similarly is provided with a chain of gating or timing relays OAT, OBT, and OCT. These relays are similar in operation to the station gating relays previously described. The circuit for energizing relay OAT may be traced from terminal B over front contact *a* of relay ORP, which is closed each time the line relay releases to indicate an off-period of the telemeter codes, back contact *b* of office telemetering disconnect relay OTMDC, back contact *a* of relay OCT, and the winding of relay OAT to terminal N. Front contact *a* of relay OAT closes when the relay picks up to bypass back contact *a* of relay OCT and provides a stick circuit for the first gating relay. The closing of front contact *b* of relay OAT completes an obvious circuit for energizing the second gating relay OBT. The closing of front contact *a* of this second relay completes a likewise obvious circuit for energizing the third gating relay OCT. The three gating relays thus pick up at approximately the same time at the beginning of each off-period of the telemeter code cycle. The release cycle of the gating relay chain, with its gate-open period, occurs during the on-time of the telemeter code, identical to the operation at the station. It is obvious that the relays release in cascade in the same order as they pick up.

Each of the gating relays has slow release characteristics whirh are furthes amplified by the half-wave rectifier connected in multiple with each relay winding as a snub. Relay OCT is provided with two slow release periods, one shorter than the other. Normally, relay OCT has a slow release period somewhat longer than that of the other two gating relays, with the snubbing circuit being traced from the left terminal of the relay winding over back contact *a* of office master and/or start repeater relay OMSTP, half-wave rectifier RE2 in the reverse direction, and terminal N to the right terminal of the relay winding. If back contact *a* of relay OMSTP is open, the snubbing circuit includes resistor Y and rectifier RE2 and, as previously explained, the release time of the relay is shorter when the resistor is connected in series with the rectifier in the snubbing circuit.

The orifice master and/or start repeater relay OMSTP is energized during the release cycle of the gating chain if start relay OST is released. As indicated on the drawing, relay OST is released only when a control code is stored for transmission. It is to be understood that the control system may also use normally deenergized start relays, which are energized to initiate or store a control code, as shown in Patent 2,442,603. In this event, front contacts of relay OST will be used instead of back contacts as shown in FIG. 2. Relay OMSTP is then energized to transfer, or complete, the circuits controlling code transmission to enable the office to transmit a control code. The circuit for energizing relay OMSTP extends from terminal B at back contact *b* of relay OST over back contact *c* of relay OAT, front contact *b* of relay OBT, and the winding of relay OMSTP to terminal N. This circuit is obviously completed during the period the gating chain is releasing, that is, during the gating period. Front contact *a* of the office disconnect repeater relay ODCP bypasses contacts *c* and *b* of relays OAT and OBT, respectively, to hold relay OMSTP energized until the final holding circuit can be completed. This holding circuit includes front contact *b* of office master relay OM. Relay OM is within the office line coding unit OLC shown conventionally in FIG. 2 by a dot-dash rectangle. Such coding units are similar to the field coding units FLC shown in FIG. 1 and are disclosed in complete detail in the previously mentioned Instruction Manual 510 or Patent 2,442,603. Only such portions of the circuit arrangement within the coding unit are herein shown as are necessary for an understanding and description of our invention and reference is again made to the published references for the complete circuit arrangement and understanding of the operation.

Relay OM is energized when a centralized control code is to be transmitted, after the transfer from the telemetering system to the centralized control system has been completed. A circuit extends from terminal B over back contact *a* of relay OST, back contact *b* of relay OCT, front contact *b* of relay ODCP, front contact *b* of relay OMSTP, circuits within the coding unit shown conventionally by a dotted line and the winding of relay OM to terminal N. Relay OM is then retained energized until the completion of the transmission of the control code by a stick circuit including its own front contact *a* and completed over various relay contacts and circuitry within coding unit OLC.

The office telemetering disconnect relay OTMDC is similar in operation and function to the field disconnect relay. Relay OTMDC is energized when the line relay is released and the gate open. The circuit may be traced from terminal B at back contact *a* of relay OR over back contact *d* of relay OAT, front contact *c* of relay OCT, and the winding of relay OTMDC to terminal N. The office disconnect repeater relay ODCP is energized upon the closing of front contact *c* of relay OTMDC, this circuit also including front contact *d* of relay OCT, front contact *b* of an office telemetering stick repeater relay OTMSP, back contact *a* of push-button repeater relay PBP, and the winding of relay ODCP. The closing of front contact *c* of relay ODCP completes the stick circuit for relay OTMDC which also includes front contact *a* and the winding of this latter relay. Relay ODCP is held energized throughout the duration of any centralized code by the circuit completed at front contact *a* of bridging repeater relay OLBP which is part of the timing chain of unit OLC, the circuit being further completed over back contact *d* of relay OCT, and thence as previously traced to the winding of relay ODCP. Relay OLBP picks up during the first step of any centralized code and remains up throughout the code, releasing during the final step as the centralized control system resets to its normal condition.

Relay OTMDC functions to complete the circuits by which line relay OR drives the office coding unit OLC to advance the operation of the counting and timing chains during both control and indication codes. The closing of front contact *d* of relay OTMDC completes the circuit from terminal B of the local source to contacts *b* and *c* of relay OR, front and back contacts *c* completing the connection to the two control wires for the timing chain and front contact *b* completing the circuit to one of the two wires controlling the counting chain of the coding unit. The circuit from back contact *a* of relay OR to the other connection to the counting chain is completed by the closing of front contact *e* of relay OTMDC, the circuit further including back contact *c* of relay OCT and back contact *d* of relay OAT.

Relay OTMDC further functions to interrupt the operation of the telemeter receiver TMR. The opening of its back contact *f* removes energy from the control contact of the receiver while the opening of back contact *g* halts the operation of the receiver motor. The interruption of these two circuits to the telemeter receiver holds intact the existing indication in the telemeter receiver, the information last received thus being maintained until the telemeter codes are returned to the line. The circuit for the control contact of telemeter receiver TMR also includes back contact *b* of relay ORP, which contact operates to follow the code pattern received by line relay OR. However, with the energy supply interrupted at back contact *f* of relay OTMDC, the control contact of receiver TMR does not function during the period when codes of the centralized control system are being transmitted. The final function of relay OTMDC is to interrupt the operation of the gating relay chain, the opening of its back contact *b* interrupting the energizing circuit for relay OAT. The gating chain thus obviously does not operate during the period when the centralized control system is connected to the line circuit.

The telemeter receiver TMR is shown conventionally by a dot-dash block since the details of such receivers are well known in the art. Furthermore, these details do not enter into the operation of the coordinating circuits of our invention and it is only necessary to understand and describe the control of the energy supplied to receiver TMR.

The office location is provided with an office transmitter repeater relay OTP which is normally, that is, during the transmission of telemeter codes from the field location, held energized by a simple circuit including back contact *c* of relay OMSTP and the winding of relay OTP. When the centralized control system is operative, relay OTP is controlled by office transmitter relay OT within office line coding unit OLC. The circuit under these conditions is traced from terminal B over back contact *a* of relay OT, back contact *e* of relay OCT, front contact *c* of relay OMSTP, and the winding of relay OTP to terminal N. Relay OT is driven, as completely described in the aforementioned printed references, by the counting chains and control functions to form the control codes transmitted by this coding unit. Its back contact *a* thus repeats the pattern of the desired control code and in turn this pattern is repeated by the operation of relay OTP. The code following operation of relay OTP operates its contact *a* between its back and front positions and thus alternately shunts and restores the line circuit extending from the line battery at the field location. The alternate increase and decrease, respectively, of the line current serves to transmit the desired control code, relay OR also following this code due to the interruption of its energizing circuit each time front contact *a* of relay OTP opens.

During the gating period, if a control code is stored for transmission from the office, relay OTP is operated to transmit a coordinating pulse over the line circuit. Under these conditions, relay OTP is held energized during the operation of the gating chain over front contact *c* of relay OBT until this relay releases. At this time, relay OCT will be picked up so that its back contact *e* is open. The circuit for relay OTP over front contact *c* of relay OMSTP to back contact *a* of relay OT is thus interrupted during the period when relay OCT is releasing and relay OTP therefore releases. The coordinating pulse thus takes the form of a line shunt as completed by back contact *a* of relay OTP. When relay OCT releases at the end of its short slow release period, as controlled by open back contact *a* of relay OMSTP, relay OTP is energized over the previously traced circuit and the coordination pulse is terminated. It is to be noted that, when relay OMSTP picks up upon the release of relay OAT to close its back contact *c*, relay OTP is retained energized because transfer contact *c* of relay OMSTP is of the continuity type so that the energization of the winding of relay OTP is not interrupted during the transfer operation. Thus only one coordinating pulse is transmitted at the proper time.

The relays OTMSP and PBP, also shown at the office location and briefly mentioned previously, provide certain synchronizing and coordinating actions under special conditions. The functions of these relays will be best understood during the operational description of the system which follows shortly.

As shown in the drawings, the system is illustrated in its telemetering condition. Specifically, the relays are shown in the positions which they occupy just prior to the termination of a telemetering indication on-time pulse. At the field location, FIG. 1, telemeter transmitter contact *a* is closed, it being remembered that, since this contact continuously opens and closes, its two positions are shown dotted. With telemeter transmitter contact *a* closed, relay FTPA is energized and its front contacts are closed as shown. The line circuit L1, L2 is thus energized from line battery LB over front contact *a* of relay FTPA so that relay OR at the office, shown in FIG. 2, is energized and its contacts picked up. It will be remembered that the gating operation occurs during the telemetering on-time period. However, as shown in the drawings, this gating operation has completed so that the gating chain relays are released. In other words, relays FAT, FBT, and FCT now occupy their released position with front contacts open. The field start relay FST is energized at this time since no indication code is stored and its back contacts *a* and *b* are open. Relay FR occupies its normal position with its control circuits all interrupted at this time. When relay FCT released, the opening of its front contact *f* interrupted the circuit for the upper winding of relay FR. The circuit for the lower winding of relay FR is interrupted at front contact *c* of relay FMP and at front contact *f* of relay FAT. Secondary winding S of impulse transformer IT is shunted at this time, the circuit including back contacts *f* of relays FCT and FTMDC. All other relays at the station are occupying their released position including those relays shown within coding unit FLC.

At the office, with relay ORP released because relay OR has its back contacts open, gating relays OAT, OBT, and OCT are also in their released position. Since relay OST is picked up, there being no control code stored, relay OMSTP was not energized during the gating period just terminated and it is in its released position. This results in relay OTP being steadily energized over back contact *c* of relay OMSTP. The line circuit from terminals L1 and L2 to line relay OR is completed over front contact *a* of relay OTP and this circuit will remain in this condition as long as the telemetering operation continues. The other relays shown at the office location are also all deenergized and thus occupy their released position. This connects energy to the telemeter receiver TMR so that the motor is operating and the control contact is responsive to the operation of contact *b* of relay ORP.

Assuming that the telemetering transmission continues, contact *a* of the telemeter transmitter at the field station opens releasing relay FTPA. This opens the line battery connection at front contact *a* of this relay and deenergizes the line circuit so that relay OR at the office releases. Line relay FR at the station holds in its normal position since its operating circuits are interrupted at this time and the secondary winding of transformer IT is shunted. At the station, the closing of back contact *b* of relay FTPA energizes relay FAT which picks up. This action is followed immediately by the energization of relays FBT and FCT which likewise pick up. The gating relays then hold as long as back contact *b* of relay FTPA remains closed.

At the office, the deenergization and release of relay OR, closing its back contact *a*, results in the energization of relay ORP which picks up. The closing of front contact *a* of relay ORP energizes relay OAT and this is followed immediately by the energization of relays OBT and OCT. Thus, it is seen that the gating relays at both station and office pick up in sequence immediately after the beginning of the off-period of the telemeter code. Continued operation of telemeter transmitter contact *a* at the station continues the transmission of the telemeter code which is transmitted over the line circuit by relay FTPA, received at the office by relay OR, and controls the telemeter receiver TMR through the operation of contact *b* of relay ORP. The code cycle of the telemeter transmitter repeats indefinitely, the cycle period in one well known system being, as previously mentioned, five seconds.

We shall now assume that the system operator desires to send a control code from the office to the station, this control code to be transmitted by the centralized control system here shown. The operator positions a control device or other control means and causes the release of start relay OST to store the control code. When telemeter transmitter contact *a* again closes at the station, energizing relay FTPA which closes the line circuit to likewise energize relay OR, relay ORP at the office is deenergized and immediately releases. The picking up of relay FTPA and the release of relay ORP simultaneously initiates the gating operation at both locations. At the office, relay OAT is deenergized by the opening of front contact *a* of relay ORP and, at the end of its slow release period, releases to open its front contacts. The actual gating period begins at this time. With relay OST released so that its back contact *b* is closed, the closing of back contact *c* of relay OAT completes the circuit for energizing relay OMSTP, the circuit also including front contact *b* of relay OBT. Thus energized, relay OMSTP picks up and its transfer contact *c* transfers the control of relay OTP to the circuit including contact *a* of relay OT of coding unit OLC. At this time, front contact *c* of relay OBT is closed so that energy is continuously supplied to relay OTP during this transfer action and for a period thereafter, this relay remaining energized and holding the line circuit complete at its front contact *a*. It is to be noted at this time that the opening of back contact *a* of relay OMSTP changes the snubbing circuit connected in multiple with the winding of relay OCT to shift the release period of this relay from its long to its short period. Since relay OBT was deenergized by the opening of front contact *b* of relay OAT, it releases at the end of its slow release period, deenergizing relays OCT and OTP, the latter by the opening of front contact *c* of relay OBT, since back contact *e* of relay OCT remains open.

With its winding deenergized, relay OTP immediately releases, opening its front contact *a* and closing the corresponding back contact to shunt the line circuit and deenergize relay OR which likewise immediately releases. The shunting of the line circuit transmits the coordinating pulse over the line circuit to the station where its action will be discussed shortly. At the office, release of relay OR completes the circuit, at its back contact *a* for energizing relay OTMDC, this circuit being completed at this intermediate stage in the operation of the gating chain when back contact *d* of relay OAT and front contact *c* of relay OCT are closed. The closing of front contact *c* of relay OTMDC completes a previously traced circuit including front contact *d* of relay OCT for energizing disconnect repeater relay ODCP which, thus energized, picks up. The closing of front contact *d* of relay OTMDC supplies energy over back contact *c* of relay OR to one connection to the timing chain of unit OLC. The timing chain, and likewise the unit, is thus driven to its reversed position under the influence of the release of relay OR and the energization of relay OTMDC. Relay OLBP is energized and picks up during this chain operation, closing its front contact *a*. The circuits to the counting chain of unit OLC are open at this time and no action occurs therein. With back contact *b* of relay OCT open, the circuit is interrupted for energizing OM. Later, when back contact *b* of relay OCT closes, the circuits within coding unit OLC, indicated in the drawing by a dotted line, are open, because of the reversed condition of unit OLC, to prevent the energization of relay OM at this time.

Relay OCT releases, following the release of relay OBT, at the end of its short slow release period. The closing of its back contact *e* bypasses open front contact *c* of relay OBT, energizing relay OTP which picks up closing its front control *a* to restore the line circuit, terminating the coordinating pulse from the office. It is to be noted that with relay OM released, relay OT in the unit remains deenergized so that its front contact *a* is closed to complete the circuit for relay OTP. Terminating the coordinating pulse at the end of the short release time of relay OCT assures that this action occurs prior to the release of relay FCT to terminate the gating period at the station and allows for variations in the release time of this latter relay.

Relay OTMDC remains energized over its stick circuit which includes front contact *c* of relay ODCP. Front contact *a* of relay OLBP within the unit is closed for a sufficient time during this period, in combination with the slow-release period of relay ODCP, to assure that this latter relay retains its front contacts closed during this reset interval. Relay OMSTP remains energized at this time over front contact *a* of elay ODCP which bypasses the now open front contact *b* of relay OBT. Relay OR, upon the restoration of the line circuit, is reenergized and picks up, driving coding unit OLC to its normal position, through the actuation of the timing chain over front contact *c* of relay OR, and the coding unit resets at this time from this normal position to its at-rest condition. This reset action is completely described in the previously mentioned publications and reference is made to these publications for a complete understanding of the reset action.

At the station, the shunt applied to the line circuit at the office causes the operation of relay FR to its reverse position in response to the pulse induced in secondary winding S of the impulse transformer IT. At this moment, in the operation of the gating chain, relay FAT has released nearly simultaneously with the release of relay OAT at the office and relay FCT is still picked up. Thus the circuit including secondary winding S and the upper winding of relay FR is completed through back contact *b* of relay FMP, back contact *e* of relay FAT, front contact *f* of relay FCT, and back contact *f* of relay FTMDC. The operation of relay FR to its reverse positioin, closing its reverse contact *a*, completes the circuit for energizing relay FTMDC, the circuit also including back contact *d* of relay FAT and front contact *d* of relay FCT. Thus energized, relay FTMDC picks up and, at its front contact *c*, completes the energizing circuit for relay FDCP, this circuit also including front contact *g* of relay FCT and front contact *a* of relay TMSP. The closing of front contact *f* of relay FTMDC bypasses front contact *f* of relay FCT in the circuit connecting the upper winding of relay FR to secondary winding S of impulse transformer IT. With relay FR already in its reverse position, the closing of front contact *e* of relay FTMDC energizes the timing chain relays of coding unit FLC, driving this relay chain and the unit to a reverse position. This operation of the timing chain causes contact *a* of relay FLBP to close, thus holding relay FDCP energized over a second circuit. With front contact *c* of relay FDCP closed, the stick circuit for relay FTMDC is effective to hold this latter relay energized upon the eventual release of relay FCT. It is to be noted that the circuit to the counting chains of unit FLC is interrupted under these conditions at back contact *d* of relay FCT. Relay FTPA is steadily energized at this time over front contact *g* of relay FTMDC and back contact *e* of relay FMSTP. With front contact *a* of relay FTPA held closed, the supply of energy from the line battery LB to the line circuit is assured under the conditions described.

When relay OCT at the office releases, energizing relay OTP to remove the shunt from the line circuit, relay FR returns to its normal position, actuated by the pulse of current in the opposite direction induced in secondary winding S of impulse transformer IT, the circuit, as previously described, now including front contact *f* of relay FTMDC. This operation of relay FR resets coding unit FLC to its normal position and the timing chain relays drop out to return the unit to its at-rest condition as described in the previously mentioned printed publications. The slow release period of relay FDCP is sufficient to bridge any interruptions in the energy supplied over front contact *a* of relay FLBP during this resetting action. This operation of relay FR to its normal position occurs at the same time that relay OR at the office returns to its normal position so that the coding units at both locations are resetting from their normal position at the same time. The release of relay FCT at the station occurs after this operation of the line relay since the release period of this relay is retained at its long interval by closed back contact *a* of relay FMSTP.

The control code stored at the office location may now be transmitted as soon as the coding units have reset to their at-rest condition. Relay OM is energized as soon as this condition is obtained, the remainder of the circuit as shown being completed over back contact *a* of relay OST, back contact *b* of relay OCT, front contact *b* of relay ODCP, and front contact *b* of relay OMSTP. Relay OM remains energized over its stick circuit shown conventionally and also retains relay OMSTP energized by the circuit completed at front contact *b* of relay OM. With relay OCT released, the circuits over the contacts of relay OR are completed to the counting chain as well as to the timing chain to permit complete operation of this coding unit. Relay OT is driven by this operation in the manner described in the printed publications and the operation of its back contact *a* drives relay OTP to alternately shunt and restore the line circuit causing operation of line relays OR and FR between their two positions. During the transmission of such centralized codes, the office gating chain relays are prevented from operating due to open back contact *b* of relay OTMDC which interrupts the energizing circuit for relay OAT and thus prevents the energization of this relay and likewise the other two relays. At the station, a similar result is effected by relay FTMDC at its back contact *b*, also open at this time. The DCP relay at each location is held energized during the coding action over front contact *a* of the corresponding bridging repeater relay LBP. Each DCP relay retains the stick circuit for the associated TMDC relay closed at its front contact *c*. At the office, back contacts *f* and *g* of relay OTMDC interrupt the supply of energy to the control contact and the motor, respectively, of telemeter receiver TMR. With the motor deenergized and the control contact ineffective, the telemeter indicators are held in position to retain the existing reading during the interruption of the telemeter coding.

If, upon completion of the control code, an indication code is to be transmitted from the station, as indicated by the release of relay FST, the circuit for relay FMSTP is completed over back contact *b* of relay FST and front contact *a* of relay FDCP which remains closed. The circuit for relay FM of the coding unit is completed over back contact *a* of relay FST, front contact *b* of relay FDCP, back contact *c* of relay FCT, and front contact *c* of relay FMSTP so that the coding unit can be activated to transmit the code. All such centralized codes as are required at this time are transmitted in sequence, the system including the circuits of our invention holding the telemetering system inactive and the centralized system connected to the line circuit as long as is required.

At the end of all such centralized system codes, the system returns to the transmission of the telemeter codes. At the office, relay OM releases, deenegrizing relay OMSTP, the initial circuit for this latter relay being open at back contact *b* of relay OST which picks up during the transmission of the final control code from the office. With relay OMSTP released, the closing of its back contact *c* completes a circuit for supplying steady energy to relay OTP which thus retains its front contact *a* closed to assure that the line circuit through the winding of relay OR remains completed. The release of relay OLBP during the final step of any centralized code deenergizes relay ODCP which eventually releases, opening its front contact *c* to deenergize relay OTMDC, the release of which follows shortly. The release of relay OTMDC returns the control of the gating relay chain to front contact *a* of relay ORP and interrupts the circuits by which relay OR controls the timing and counting chains of coding unit OLC. The office location is thus returned to its condition for receiving telemeter codes over the line circuit.

At the station, the release of relay FLBP deenergizes relay FDCP which releases and in turn deenergizes relay FTMDC. The release of this latter relay returns the control of relay FTPA to telemeter transmitter contact *a* to permit the subsequent transmission of telemeter codes. The closing of back contact *f* of relay FTMDC restores the shunt on secondary winding S of impulse transformer IT, removing the control of relay FR from this winding at this time. The closing of back contact *b* of relay FTMDC restores the control of the gating relay chain to back contact *b* of relay FTPA. At this time, the apparatus at the station location is restored to the condition in which the telemeter codes may be transmitted by the telemeter transmitter through operation of its contact *a*.

We shall assume now that an indication code is to be transmitted from the station location. In other words, the operation of an indication function causes the release of start relay FST. During the next telemeter code on-time, relay FTPA, energized by contact *a* of the telemeter transmitter, picks up closing the line circuit to cause the reenergization of relay OR at the office. Line relay FR at the station remains in its normal position as shown. The opening of back contact *b* of relay FTPA deenergizes gating relay FAT. When this relay releases at the end of its slow release period, to open the coordinating gate, the circuit is completed for energizing relay FMSTP. This circuit is traced from terminal B over back contact *b* of relay FST, front contact *b* of relay FBT, back contact *c* of relay FAT, and the winding of relay FMSTP to terminal N. The pick up of contacts *d* and *e* of relay FMSTP transfers the control of relays FTPA and FTPB to contact *a* of relay FT in coding unit FLC. At this time, with front contact *c* of relay FBT closed, the two transmitter repeater relays are not deenergized during this transfer operation, the continuity type transfer contacts assuring that energy is continuously supplied to the relay windings. With these relays remaining energized, the line circuit remains closed and relay FR remains in its normal position.

It is to be noted that the opening of back contact *a* of relay FMSTP changes the release time of relay FCT from its normal long period to the selected short period, resistor X being inserted in series with rectifier unit RE1 and the series circuit being connected in multiple with the relay winding. With front contact *b* of relay FCT closed, the closing of front contact *b* of relay FMSTP energizes relay FMP which then picks up. The obvious circuit over front contact *a* of relay FMP retains relay FMSTP energized, although the initial circuit for this latter relay is still complete. However, the closing of front contact *b* of relay FMP restores the shunt on secondary winding S of impulse transformer IT which was interrupted by the opening of back contact *f* of relay FCT. The new shunt circuit is traced from the left terminal of the secondary winding over front contact *b* of relay FMP, back contact *e* of relay FAT, front contact *f* of relay FCT, and back contact *f* of relay FTMDC to the right hand terminal of secondary winding S.

The release of relay FBT at the end of its slow release period following the release of relay FAT deenergizes relays FTPA and FTPB which immediately release. The opening of front contact *a* of relay FTPA interrupts the line circuit to transmit a coordinating pulse to the office location. This line-open pulse results in the deenergization of relay OR causing it to release. A similar coordination pulse is recorded at the station by the operation of relay FR to its reverse position, energy being supplied by the circuit traced from terminal B, over front contact *c* of relay FMP, back contact *b* of relay FTPB, the lower winding of relay FR in the direction opposite to the arrow, and back contact *a* of relay FTPB to terminal N. The flow of current in this circuit causes relay FR to close its reverse contacts. The closing of reverse contact *a* of relay FR completes the previously traced circuit for energizing relay FTMDC which includes also front contact *d* of relay FCT. With front contact *c* of relay FTMDC now closed, the circuit is completed to energize relay FDCP which likewise picks up. The previously traced stick circuit for relay FTMDC is now completed and relay FDCP closes its front contact *a* to also hold relay FMSTP energized, if relay FMP should briefly release. The closing of front contact *e* of relay FTMDC completes the circuit over reverse contact *b* of relay FR for initiating the reverse operation of the timing chain of unit FLC. The shunt circuit for secondary winding S is transferred at this time to front contact *f* of relay FTMDC which bypasses front contact *f* of relay FCT.

Relay FCT, deenergized by the opening of front contact *a* of relay FBT, releases at the end of its short release period which is in effect at this time. The closing of back contact *e* of relay FCT restores the circuit for reenergizing relays FTPA and FTPB, back contact *a* of relay FT remaining closed during this period. The closing of front contact *a* of relay FTPA terminates the coordinating pulse transmitted to the office and the reversal of the current flowing through the lower winding of relay FR due to the pole changing action of contacts *a* and *b* of relay FTPB restores relay FR to its normal position. The short slow release time of relay FCT thus terminates the coordinating pulse prior to the closing of the gating period at the office, which is controlled by the longer release time of relay OCT. It is to be noted that prior to the release of relay FCT, the energizing circuit for relay FM is interrupted at back contact *c* of relay FCT. At this time, the circuit external to the unit FLC for relay FM is completed, but due to the action of the timing chain within the unit, the circuit remains interrupted and relay FM remains released. The opening of front contact *b* of relay FCT deenergizes relay FMP, but this relay remains with its front contacts closed for its slow release period. The operation of relay FR to its normal position again energizes the timing chain relays and initiates a normal reset action of coding unit FLC. This operation of the timing chain retains front contact *a* of relay FLBP closed for a sufficient period to supply energy to relay FDCP so that, in combination with the slow release characteristics of this relay, its front contacts are retained closed during this reset action.

At the end of the reset action of the timing chain, coding unit FLC is ready to transmit an indication code. The circuit for relay FM is completed and this relay picks up, reenergizing relay FMP which then holds relay FMSTP energized during the entire indication code. The initial circuit for relay FMSTP over back contact *b* of relay FST will be interrupted when this latter relay picks up during the progress of the coding action. Front contacts *d* and *e* of relay FTMDC are closed so that energy may be supplied to the timing and counting chains of unit FLC over normal and reverse contacts *a* and *b* of relay FR in the usual manner. During the coding action, the alternate opening and closing of back contact *a* of relay FT drives relays FTPA and FTPB to follow the code pattern. The alternate opening and closing of front contact *a* of relay FTPA transmits the code pattern over the line circuit to the office location. The alternate operation of contacts *a* and *b* of relay FTPB between their release and picked up position causes the operation of relay FR between its reverse and normal position to drive the coding action of the circuits within the coding unit FLC. During this coding action, front contact *a* of relay FLBP remains continuously closed to assure that relay FDCP remains energized. This latter relay keeps its front contact *c* closed to maintain the stick circuit for relay FTMDC.

At the office location, when relay OR is deenergized at the beginning of the coordinating pulse from the station, relays OAT and OBT of the gating chain have already released, these actions occurring practically simultaneously with the release of the similar relays at the station location. The release of relay OR to close its back contact *a* thus energizes relay OTMDC, the circuit also including back contact *d* of relay OAT and front contact *c* of relay OCT, this latter contact being closed at this time. The closing of front contact *c* of relay OTMDC completes a previously traced circuit for energizing relay ODCP which, thus energized, picks up closing its front contact *c* to complete the stick circuit for relay OTMDC. With relay OR released, the closing of front contact *d* of relay OTMDC initiates the action of the timing chain of unit OLC in the same manner as described for the control code. Although front contact *a* of relay ORP is closed, open back contact *b* of relay OTMDC prevents the initiation of any gating action by assuring that relay OAT remains deenergized during the remainder of the indication code. At the same time, back contacts *f* and *g* of relay OTMDC prevent any operation of the telemeter receiver, retaining whatever indication was displayed until the indication code has completed.

At the termination of the coordination pulse, relay OR is reenergized and picks up, closing its front contact *c* to drive the timing chain to the normal position and subsequet reset action. This occurs at the same time that relay FR at the station occupies its normal position to initiate a normal reset action in coding unit FLC. After these operations have begun, relay OCT releases at the end of its long release period which is in effect since back contact *a* of relay OMSTP is closed. Again front contact *a* of relay OLBP is closed for a sufficient time interval, in combination with the slow release period of relay ODCP, to retain this latter relay picked up. With the release of relay OCT, the office circuits are prepared to receive the indication code at the end of the reset period of the coding unit at each location. Relay OTP is held steadily energized over back contact *c* of relay OMSTP so that relay OR is continuously connected to the line circuit. As previously mentioned, the gating chain operation is prevented by the open back contact *b* of relay OTMDC. The same relay at its front contacts *d* and *e* completes the circuits to place the timing and counting chains of unit OLC under control of line relay OR which will follow the code pattern transmitted from the station.

The system remains in the condition which was last described for as long as any centralized control system codes remain to be transmitted. If, during this period, a control code is stored for transmission, relay OMSTP will be energized by the circuit including back contact *b* of relay OST and front contact *a* of relay ODCP. At the proper time in the transmission sequence of the various codes, relay OM will be energized, the circuit external to the coding unit being completed over back contact *a* of relay OST, back contact *b* of relay OCT, and front contacts *b* of relays ODCP and OMSTP. In keeping with the priorities established in such a centralized control system, unit OLC will be activated at the proper time to drive relay OT, so that its back contact *a* repeats the code pattern. Operation of this contact is repeated by relay OTP, which actually transmits the code through its contact *a*.

At the end of the indication code which initiated the transfer action, relay FST will already be picked up so that relay FMSTP releases after the cascaded release of relays FM and FMP. Likewise relays FDCP and ODCP will release after the end of the final code step when their circuits are interrupted at front contact *a* of the corresponding bridging repeated relay LBP. At each location the TMDC relay releases, deenergized by the interruption of its stick circuit at front contact *c* of the corresponding relay DCP. At the station, the release of relay FTMDC returns the control of relay FTPA to telemeter transmitter contact *a*. At the office, release of relay OTMDC returns the control of the telemeter receiver control contact to contact *b* of relay ORP and also initiates the operation of the telemeter receiver motor. At this time, the transmission of telemeter indication codes is returned to the line circuit, functioning in the manner described previously.

It may occur that the station and office locations initiate the requirement for a centralized code simultaneously. In other words, relays OST and FST release at nearly the same time, at least during the same off-time of a telemeter code. As the gating relay chains release during the next telemeter code on-time, the apparatus at each location functions to transmit a coordinating pulse in the manner previously described individually for each location. At the station, the coordinating pulse is in the form of a line-open period while at the office the pulse is transmitted as a line shunt. The apparatus at each location drives itself to transfer from telemeter code to centralized code. This action is entirely locally controlled since the coordinating pulses are not received at the opposite ends of the line circuits. The gating relays CT at each location release at the same time, each having a short slow release period under the influence of open back contact *a* of the local MSTP relay. Each line relay, that is, FR and OR, is returned under local control to its normal or picked up position, respectively, at the same time so that coding units FLC and OLC reset under this normal condition simultaneously. With each location in the condition for transmitting a code in the centralized system, both such code, that is, a control and an indication code, are initiated and the first code pulse transmitted simultaneously. Under these conditions, one location is assigned the priority and operates to lock out the other location. It is sufficient to note that in the system shown here, the indication code has priority and the office location is locked out until the indication code transmission has been completed. At this time, the control code which has been stored during this indication code is allowed to complete its transmission. Reference is made to the aforementioned printed publications for a complete description of such synchronizing action.

The system of our invention includes various bypass arrangements to overcome fault conditions which may occur. At the station, there is shown a telemetering stick repeater relay TMSP. As long as the telemetering equipment at the station is functioning properly and the indication relays are energized for the control of the telemeter transmitter, relay TMSP remains energized. If any fault condition occurs in the telemeter transmitter and in the associated indication equipment such that telemeter codes are not transmitted, the release of relay TMSP energizes relays FTMDC and FDCP. The circuits for this energization are obvious, being completed over back contacts *a* and *b* of relay TMSP. The closing of front contact *g* of relay FTMDC bypasses the control exercised by contact *a* of the telemeter transmitter and holds relay FTPA continuously energized. This action restores the line circuit and holds it in this condition so that energy from line battery LB is supplied over the line circuit to the office. With relays FTMDC and FDCP held energized, station line coding unit FLC can control transmission of an indication code if relay FST releases. The circuit for relay FM, previously described, will be completed by the closing of back contact *a* of relay FST to initiate operation of coding unit FLC. Relay FMSTP will likewise be energized and will transfer the control of relays FTPA and FTPB to contact *a* of relay FT. Indication codes will then be transmitted as previously described by the operation of contact *a* of relay FTPA, the coding unit being driven by relay FR as it is controlled by the operation of contacts *a* and *b* of relay FTPB. Although not shown or described in detail, the transmission of the first indication code must be properly coordinated so that the office apparatus is in condition to receive this code. The first code is transmitted immediately to indicate the failure and causes the telemeter receiver to remain disconnected until the fault is corrected. With relay FTPA held continuously energized when no indication code is being transmitted, the line circuit is complete and control codes transmitted by the office may be received by relay FR and recorded by coding unit FLC.

At the office location, a similar telemetering stick repeater relay OTMSP is provided. This relay is retained energized as long as a telemeter indication is registered in telemeter receiver TMR. If the telemeter receiver develops a fault which removes the indication or if no indication is received from the station, relay OTMSP is deenergized and releases. The push-button repeater relay PBP is controlled locally by such fault conditions as a power failure and may also be controlled manually by the operator. It is energized only when such a fault condition occurs or when the operator closes a push-button circuit. Relay OTMSP, upon release, transfers the system to centralized control by continuously energizing relays OTMDC and ODCP over obvious circuits completed at back contacts *a* and *b*, respectively, of relay OTMSP. Under this condition, if relay OST is released to initiate a control code, relay OMSTP is immediately energized followed by the energization of relay OM in the manner previously described. Coding unit OLC then operates to drive relay OT which in turn, through its back contact *a*, drives relay OTP in a similar code pattern. Operation of contact *a* of relay OTP transmits the control code over the line circuit by alternately shunting and restoring the line, as previously described. The first code, which is transmitted immediately, must be properly coordinated and results in shutting down the telemeter transmitter until the fault is corrected.

When the fault condition which caused the release of relay OTMSP is alleviated, it is necessary for the operator to restore the system to normal operation. The manual energization of relay PBP accomplishes this action. The opening of back contacts *b* and *a* of relay PBP deenergizes relays OTMDC and ODCP if the centralized system is at rest. If these relays are held energized due to the transmission of a centralized code, their release is delayed until such coding action ceases. The release of relay OTMDC allows the telemeter code from the station to be received and the recording of the indication in telemeter receiver TMR again energizes relay OTMSP so that it picks up and restores the system to normal operation.

It is obvious from the preceding discussion of the system operation under fault conditions that, by initiating the transmission of the proper control code and by local manipulations, the system operator may completely shut down the telemetering system and disconnect it from the line circuit. Under such conditions, the line circuit is continuously available to the centralized control system and no coordination is required prior to the transmission of either a control or an indication code.

The system of our invention thus assures a proper coordination between the two control systems sharing a common line circuit between the station and the office illustrated. The periodic operation of the gating relay chain during the transmission of the telemeter codes provides a synchronized means of controlling the transfer from telemeter codes to the centralized control codes. The gating period allows coordinating pulses to be transmitted in either direction over the line circuit to initiate the transfer operation in a simple and direct manner. The coordinating pulse assures that the centralized control units at each location are properly actuated and prepare themselves for code transmission and/or reception simultaneously so that the centralized codes will be properly transmitted and received over the system. This action is automatic and requires no supervision on the part of the system operator. At the close of a period of transmission of centralized system codes, the return of each location to a condition in which the telemeter codes may be transmitted over the line circuit and properly received is likewise automatic and proceeds without manual actions. The system of our invention thus provides a relatively simple and economical means of accomplishing the coordination of the two systems which permits the common use of a single communication channel. At the same time, the codes of each system are properly separated so that no interference and incorrect action can occur.

Although we have herein described and shown but one form of coordination circuits embodying our invention, it is to be understood that changes and modifications may be made therein within the scope of the appended claims without departing from the spirit and scope of our invention.

Having thus described our invention, what we claim is:

1. In combination, a communication channel connecting a first and a second location, a first code controlled communication system operable to transmit continuously recurring code cycles from said first location to said second location, a second code controlled communication system operable at times to transmit codes in either direction between said first and said second location, connecting circuit means at each location for normally connecting said first system to said channel, and a transfer circuit arrangement operable to transfer said connecting means from said first system to said second system to permit transmission of second system codes over said channel, said transfer circuit arrangement including at each location a gating means periodicaly responsive to the operation of said first system and a pulse relay means effective when actuated for transmitting a coordinating pulse to initiate operation of said transfer circuit arrangement, each said pulse relay means being actuated in response to the operation of the associated gating means when a second system code is stored at the corresponding location for transmission.

2. In combination, a communication channel connecting a first and a second location, a normally active telemetering system operable to transmit recurring indication cycles from said first location to said second location, a centralized control system operable at times to transmit codes in either direction between said first and said second location, connecting circuit means at each location for normally connecting said telemetering system to said channel, and a transfer circuit arrangement at each location operable to transfer the corresponding connecting circuit means from said telemetering system to said centralized control system to permit transmission of centralized control system codes over said channel, each said transfer circuit arrangement including a gating relay means periodically responsive to the operation of said telemetering system and a pulse relay means effective when actuated for transmitting a coördinating pulse to initiate operation of both said transfer circuit arrangements, each said pulse relay means being actuated in response to the operation of the associated gating relay means when a centralized control system code is stored at the corresponding location for transmission.

3. In combination, a communication channel connecting a first and a second location, a telemetering system operable to transmit indications from said first location to said second location, a remote control system including a transmitter-receiver at each location operable to transmit codes which control the receiver at the other location, a first circuit means at each location normally connecting said telemetering system to said channel, a gating means at each location responsive to the operation of said telemetering system for periodically inserting a gating period during the indication transmission, a pulsing circuit means at each location responsive to the operation of the associated gating means only when a control system code is stored for transmission at the corresponding location for actuating the transmission of a coordination pulse during that gating period, a transfer relay means at each location responsive to each coordination pulse for transferring said first circuit means at the corresponding location to connect the corresponding transmitter-receiver to said channel and to disconnect said telemetering system to effect the transmission of said stored control system code.

4. In combination, an office and a station location connected by a single communication channel, a normally active telemetering system having connections to said channel and operable to transmit information from said station to said office, a normally inactive centralized control system operable to transmit codes in either direction between two locations, a gating means at each location responsive to the operation of said telemetering system for periodically opening a gating period during said telemetering transmissions, a pulsing means at each location responsive to the operation of said gating means during said gating period for transmitting a coordinating pulse only when a control system code is stored for transmission from the corresponding location, and a transfer means at each location responsive to the reception of a coordinating pulse from either location for transferring the channel connections from said telemetering system to said control system to effect the transmission of said stored control system code.

5. In combination, a first and a second location connected by a communication channel, a normally active telemetering system operable to transmit information codes from said first location to said second location, a remote control system including a transmitter-receiver at each location operable to transmit codes to control the receiver at the other location, a transmitter relay means at each location having connections to said channel, circuit means for normally connecting said transmitter relay means at each location for transmission of said telemetering system codes over said channel, a gating means at each location responsive to the operation of said telemetering system for periodically opening a gate period during said telemetering codes, pulsing means at each location responsive to the operation of said gating means only when a control system code is stored for transmission from that location for controlling the associated transmitter relay means to transmit a coordinating pulse, and transfer circuit means at each location responsive to the reception of a coordinating pulse from either location during said gate period for transferring said connecting circuit means from said telemetering system to said control system for transmission of the stored code over said channel.

6. In combination, a single line circuit connecting an office and a station location, a normally active telemetering system operable to transmit recurring indication cycles from said station to said office, a centralized control system including at each location a code transmitter-receiving operable to at times transmit codes to control the receiver at the other location and a normally open start contact which closes only when a code is stored for transmission, line circuit connecting means at each location normally connecting said telemetering system to said line circuit, transmitting contact controlled by each of said line circuit connecting means to repeat the pattern of any code originating at the corresponding location for transmitting that code over said line circuit, a gating relay chain at each location operable in sequence in response to the transmission of each telemetering indication cycle, each said gating chain being effective to open a gate period of preselected length during each telemetering indication cycle, a pulsing means at each location controlled by contacts of said gating chain relays closed in series during said gate period and the corresponding start contact for controlling the corresponding transmitting contact to transmit a coordinating pulse over said line circuit only when a centralized system code is stored at that location, transfer relay means at each location effective when energized to transfer the associated line circuit connecting means from said telemetering system to said centralized control system, the corresponding transmitting contact thus being made effective to repeat a centralized system code originated by the corresponding transmitter-receiver, and an energizing circuit for each transfer relay means including a contact closed in response to the transmission of a coordinating pulse from either location and other contacts of said gate relays closed in series during said gating period, each said transfer relay means being held energized during operation of the corresponding transmitter-receiver.

7. A coordination circuit arrangement to control the joint use of a common communication channel by a first and a second coded remote indication system, comprising, a transmitter relay controlled at times by said first system and at other times by said second system, a gating circuit means responsive to the operation of said transmitter relay when controlled by said first system for opening a coordinating gate periodically, a start repeater relay, an energizing circuit for said repeater relay completed by said gating means when said coordinating gate is open if a code is stored by said second system, an energizing circuit network for said transmitter relay including an energized position contact of said repeater relay, a coding contact of said second code system, and contacts responsive to the operation of said gating means during said gating period for controlling said transmitter relay to transmit a coordinating pulse, said second code system being actuated in response to the transmission of said coordinating pulse for holding said repeater relay energized to effect control of said transmitter relay by said coding contact.

8. A coordination circuit arrangement to effect joint use of a single communication channel by a first normally-active and a second normally-inactive code controlled communication system, comprising, a transmitter repeater relay controlled normally by said first system and at selected times by said second system, a gating circuit means normally responsive to the operation of said transmitter repeater relay for periodically opening a coordinating gate, a start repeater relay, an energizing circuit for said start repeater relay completed by said gating means when said coordinating gate is open only if a code is stored for transmission by said second system, pulse circuit means controlled by an energized position contact of said start repeater relay and a normally closed code following contact of said second system and responsive to the operation of said gating means during the gate open period for controlling said transmitter repeater relay to transmit a coordinating pulse, a disconnect relay means energized in response to the transmission of said coordinating pulse and effective when energized to activate said second system and to deactivate said first system, said second system being effective when active to operate said code following contact to control said transmitter repeater relay to transmit said stored second system code and to hold said start repeater relay and said disconnect relay means energized until the transmission of said stored code is complete.

9. A coordination circuit arrangement to provide joint use of a common communication channel by a first and a second code controlled communication system, comprising, channel connection means for normally connecting said first system to said channel, a gating means periodically responsive to the code operation of said first system for opening a coordinating gate, a start repeat relay means normally occupying a first position and operable to a second position when said coordinating gate is open only if a second system code is stored for transmission, a code transmitting means responsive jointly to the operation of said gating means and to said start repeat relay means occupying its second position for transmitting a coordinating pulse over said channel, a disconnect relay effective when energized to transfer said channel connections from said first system to said second system, an energizing circuit for said disconnect relay including a contact closed in response to the transmission of said coordinating pulse and contacts controlled by said gating means to be closed during the period said coordinating gate is open, and a stick circuit means controlled by said second system for holding said disconnect relay energized until said second system has completed its code transmission.

10. Coordination apparatus for a first and a second remote indication system using a common communication channel comprising, a circuit connection means for normally connecting said first system to said channel, a gating means responsive to the normal operation of said first system for periodically providing a coordinating period, a start repeater relay energized during said coordinating period only when operation of said second system is required, a pulsing circuit including contacts controlled by said gating means and an energized position contact of said start repeater relay, said pulsing circuit being effective during said coordinating period when said start repeater relay is energized to transmit a coordinating pulse, a disconnect relay means energized in response to the transmission of said coordinating pulse, and a transfer circuit means controlled by other contacts of said start repeater relay and by contacts of said disconnect relay means when operation of said second system is required for transferring said circuit connection means from said first system to said second system.

11. Coordination apparatus for a first and a second remote indication system using a common communication channel, each system being operable when selected to transmit indication codes over said channel, said coordination apparatus comprising, a circuit connection means for normally connecting said first system to said channel, a gating relay chain sequentially operable in response to each recurring code transmission by said first system to periodically insert a coordination period into said first system code transmissions, a start repeater relay and an energizing circuit therefor including contacts of said gating relays closed in series only during said coordination period and a start contact closed only when operation of said second system is required; a pulsing circuit arrangement including a transmitter repeater relay, an energized position contact of said start repeater relay, and other contacts of said gating relays; said pulsing circuit arrangement being effective at times to transmit a coordinating pulse during a coordination period, a disconnect relay and an energizing circuit therefor including a contact closed in response to the transmission of said coordinating pulse, and a transfer circuit arrangement including other contacts of said start repeater relay and contacts of said disconnect relay, said transfer circuit arrangement being effective at said times to initiate operation of said second system and to transfer said circuit connection means from said first system to said second system.

12. A coordination system for a normally-active coded telemetering system and a normally-inactive centralized code control system using a common communication channel, said telemetering system normally having connections to said channel to transmit recurring code cycles, said coordination system comprising, a gating relay chain operable in sequence in response to the transmission of each code cycle by said telemetering system, said gating relay chain being effective during operation to open a coordinating gate period during each telemetering code cycle, a start repeater relay and an energizing circuit therefor including contacts of said gating relays closed in series only during said coordinating gate period and a contact closed only when transmission of a code by said centralized system is required, a transmitter repeater relay, a pulsing circuit arrangement including an energized position contact of said start repeater relay and other contacts of said gating relays, said pulsing circuit arrangement being effective at times to control said transmitter repeater relay to transmit a coordinating pulse during said coordinating gate period, a disconnect relay and an energizing circuit therefor including a contact closed in response to the transmission of said coordinating pulse, and circuit transfer means controlled by other contacts of said start repeater relay and contacts of said disconnect relay, said circuit transfer means being effective at said times to initiate operation of said centralized system to transmit the required code and to interrupt the transmission of said telemetering code cycles.

13. A coordination circuit arrangement to control joint use of a single line circuit by a normally active telemetering system and a normally-inactive centralized control system, comprising, a transmitter repeater relay having a contact interposed in said line circuit and normally controlled to effect transmission of the code cycles of said telemetering system, a chain of gating relays operable in sequence in response to the transmission of each telemetering code cycle, said gating relays being effective to open a coordinating gate for a selected period during each telemetering code cycle, a start repeater relay and an energizing circuit therefor including a contact closed only when a code is stored for transmission in said centralized system and gating relay contacts closed in series only during said gate period; a pulsing circuit including the winding of said transmitter repeater relay, an energized position contact of said start repeater relay, a normally closed coding contact of said centralized system, and a gating relay contact arrangement open-circuited only during said gate period; said pulsing circuit being effective to control said transmitter repeater relay to at times transmit a coordinating pulse over said line circuit during said gate period and at other times to transmit codes originated by said centralized system, a disconnect relay and an energizing circuit therefor including a contact closed in response to the transmission of said coordinating pulse and other contacts of said gating relays closed in series only during said gate period, said disconnect relay when energized being effective to initiate operation of said centralized system and to interrupt the transmission of said telemetering code cycles, said normally closed coding contact controlling said transmitter repeater relay in accordance with the code pattern of operation of said centralized system.

14. In combination, a communication channel connecting a first and a second location, a first code controlled communication system operable to continuously generate recurring code cycles at said first location, a second code controlled communication system operable when actuated to generate codes at each location, connecting circuit means at each location for normally connecting said first system to said channel to transmit its codes from said first to said second location, and a transfer circuit arrangement at each location for transferring the corresponding connecting circuit means from said first system to said second system to effect transmission of second system codes over said channel, each transfer circuit arrangement including a gating means periodically operable in response to the operation of said first system and a pulse relay means effective when actuated for transmitting a coordination pulse to initiate the transfer operation of both transfer circuit arrangements, each pulse relay means being actuated in response to the operation of the associated gating means when said second system at the corresponding location is actuated.

References Cited in the file of this patent

UNITED STATES PATENTS

| | | |
|---|---|---|
| 2,239,552 | De Croce et al. | Apr. 22, 1941 |
| 2,327,251 | Derr | Aug. 17, 1943 |
| 2,504,999 | McWhirter | Apr. 25, 1950 |
| 2,586,427 | Hagenau | Feb. 19, 1952 |
| 2,644,931 | Derr et al. | July 7, 1953 |
| 2,835,884 | Markow | May 20, 1958 |

UNITED STATES PATENT OFFICE
CERTIFICATE OF CORRECTION

Patent No. 3,001,182

September 19, 1961

Arthur P. Jackel et al.

It is hereby certified that error appears in the above numbered patent requiring correction and that the said Letters Patent should read as corrected below.

Column 24, lines 27 and 28, for "transmitter-receiving" read -- transmitter-receiver --; line 33, after "circuit," insert -- a code --; line 56, for "gate" read -- gating --; same column 24, line 57, for "gating" read -- gate --.

Signed and sealed this 17th day of April 1962.

(SEAL)
Attest:

ESTON G. JOHNSON

Attesting Officer

DAVID L. LADD

Commissioner of Patents